UNITED STATES PATENT OFFICE.

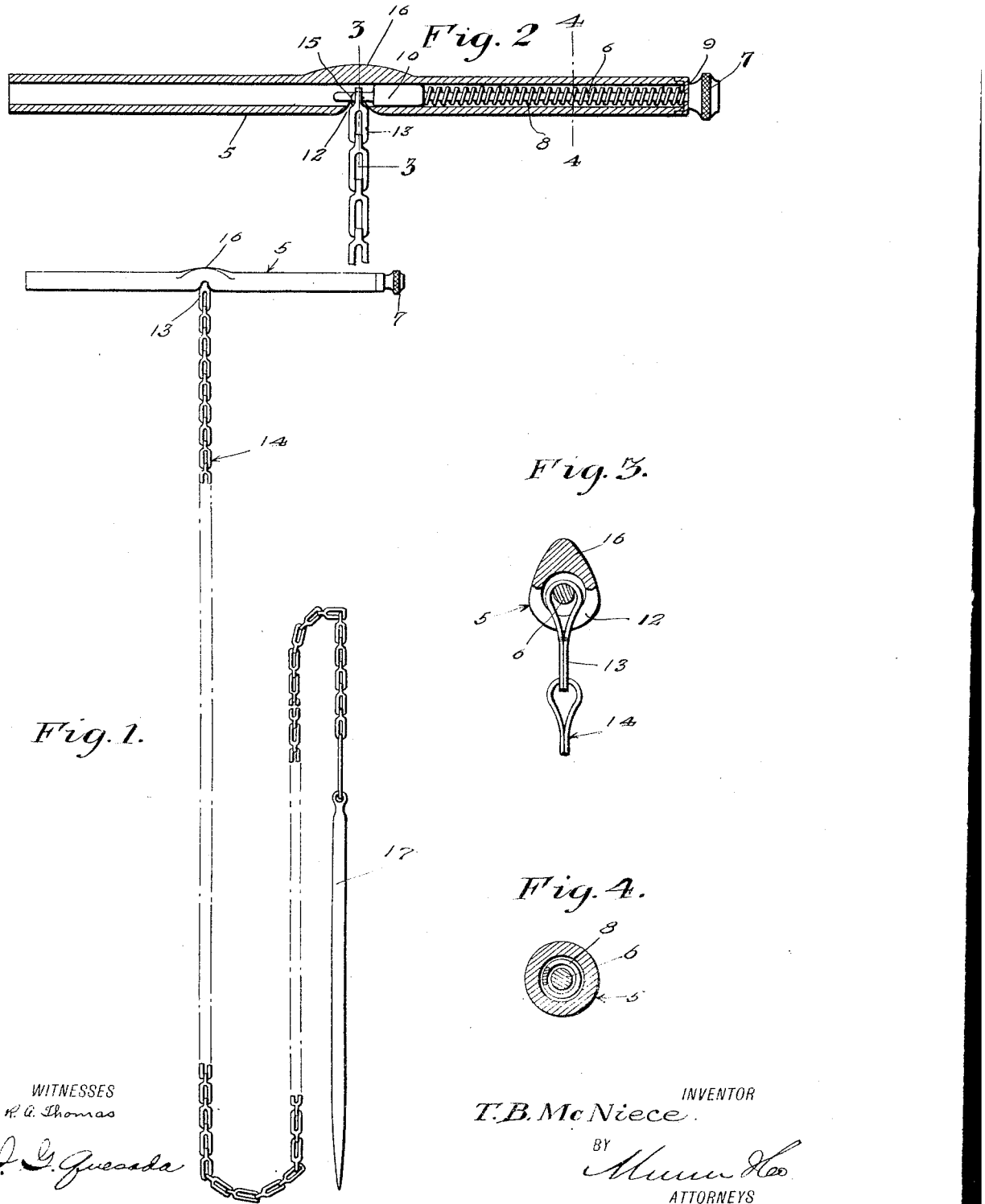

THOMAS BRAINARD McNIECE, OF MANSFIELD, OHIO, ASSIGNOR OF ONE-HALF TO FOREST L. GARRISON, OF CINCINNATI, OHIO.

FISH STRINGER.

1,417,759.  Specification of Letters Patent.  Patented May 30, 1922.

Application filed May 12, 1921. Serial No. 469,030.

*To all whom it may concern:*

Be it known that I, THOMAS B. MCNIECE, a citizen of the United States, and a resident of Mansfield, in the county of Richland and State of Ohio, have invented certain new and useful Improvements in Fish Stringers, of which the following is a specification.

This invention relates to fish stringers.

Briefly stated, an important object of this invention is to provide a stringer having novel means whereby a plurality of fish may be conveniently and expeditiously strung for purpose of transportation.

The invention forming the subject matter of this application aims also to provide a fish stringer having novel means whereby the fish may be conveniently removed from the string when desired.

A further object of the invention is to provide a fish stringer which is simple to use, durable in construction and cheap to manufacture.

Other objects and advantages of the invention will be apparent during the course of the following description.

In the accompanying drawing forming a part of this application and in which like numerals are employed to designate like parts throughout the same.

Figure 1 is an elevation of the improved stringer,

Figure 2 is a detail longitudinal sectional view through the same,

Figure 3 is a vertical transverse sectional view taken on line 3—3 of Figure 2, and Figure 4 is a vertical transverse sectional view taken on line 4—4 of Figure 2.

In the drawing, wherein for the purpose of illustration is shown a preferred embodiment of the invention, the numeral 5 designates a barrel which is of tubular formation and which is provided with a longitudinally slidable plunger 6 having its rear end portion formed with a head 7 adapted to be manually engaged when it is desired to withdraw the plunger. The plunger 6 is urged to its advance position by means of a retractile coil spring 8 which is engaged at one end with the closed rear end of the valve 9 and at its other end with an enlarged portion 10 formed adjacent the forward end of the plunger. The annular enlargement 10 at the forward portion of the plunger not only serves as a stop element for the spring 8 but also as a guide for the plunger since the same is snugly fitted within the barrel.

As illustrated in Figure 2, the forward end portion of the plunger 6 normally extends across an opening 12 in the intermediate portion of the tubular barrel and is adapted to be engaged by the terminal link 13 of a chain or other flexible element generally designated by the numeral 14. The opening 12 has its side walls gradually reduced so as to form a guide whereby the terminal link 13 is directed into the opening. The shoulders 15 of the forward portion of the link are engaged with the gradually restricted walls of the opening so that the link is held against undue movement when the same is engaged with the forward portion of the plunger 6. The upper side of the barrel 5 is formed with a thickened portion or an enlargement 16 which serves as a means for compensating for the weakness of the intermediate portion of the barrel due to the gradually restricted entrance opening 12.

The forward portion of the flexible element 14 has a pin or long needle 17 connected thereto which is adapted to be pushed through the head of the fish in the usual manner.

In stringing the fish on the flexible element 14 it is merely necessary to force the pin 17 through the head of the fish in the usual manner and thereupon move the fish along the flexible element 14. In transporting the fish subsequent to catching the same, the pin 17 may be extended into the forward portion of the tubular barrel so as to form a semicircular loop upon which the fish are carried. When it is desired to remove the fish from the flexible element 14 or string as the same may be called, it is merely necessary to retract the plunger 6 by moving the head 7 rearwardly, whereupon the forward end portion of the plunger will be released from engagement with the terminal link 13. The fish may be now disengaged from the chain since the free end of the chain may be fastened to the head of the fish. The device may be conveniently carried along with the other fishing tackle since the same occupies but a small amount of space.

As illustrated in Figures 2 and 3, the entrance opening 12 which is gradually restricted is of arcuate formation and is extended transversely of the barrel 5 and is of a width sufficient to receive the eye of the terminal link. When the eye of the terminal link is arranged within the barrel, the shoulders formed on the intermediate portion of the terminal link of the chain will engage the walls of the gradually restricted entrance opening whereby to position the eye in alignment with the spring actuated plunger so that when the plunger is allowed to advance the same will pass through the eye of the terminal link. This forms a means whereby the flexible element which is in the nature of a chain 14 may be conveniently connected to the barrel.

As illustrated in Figures 2 and 3, the terminal link of the flexible chain is formed from a single length of material bent intermediate its ends to provide an attaching eye adapted to be positioned within the barrel so as to receive the forward end of the spring actuated plunger. It will be seen that the end portions of the length of material forming the terminal link are enlarged so as to form shoulders adapted to engage the wall of the gradually restricted entrance opening whereby to positively position the attaching eye of the terminal link.

It will be observed also that since the terminal link 13 is connected to the plunger at the intermediate portion of the barrel the flexible element will form a means whereby the hand is prevented from slipping off the barrel 5 in carrying the device. In other words, in gripping the device, the forefinger may be arranged on opposite sides of the flexible element so that the plunger will be prevented from moving out of the ends of the hand should the barrel be slippery.

Having thus described the invention, what I claim is:—

In a fish stringer, the combination with a barrel having an integral thickened intermediate portion provided with a narrow gradually restricted entrance opening, of a spring actuated plunger within said barrel and movable across said opening, and a chain having a terminal link formed from a single length of material bent intermediate its ends whereby to form an attaching eye adapted to be received within said barrel, the end portions of said length of material being enlarged to form shoulders adapted to engage the walls of said gradually reduced entrance opening whereby to position said attaching eye.

THOMAS BRAINARD McNIECE.